United States Patent
Armangau et al.

(10) Patent No.: US 9,703,498 B1
(45) Date of Patent: Jul. 11, 2017

(54) ALLOCATING SPACE IN A FILE SYSTEM FROM SEQUENTIAL AND RANDOM CURSORS

(71) Applicant: EMC IP Holding Company LLC, Hopkinton, MA (US)

(72) Inventors: Philippe Armangau, Acton, MA (US); Feng Zhang, Shanghai (CN); Ahsan Rashid, Edison, NJ (US); Rohit Chawla, Scotch Plains, NJ (US); Hao Pan, Shanghai (CN); Diane M. Delgado, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/753,375

(22) Filed: Jun. 29, 2015

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0631* (2013.01); *G06F 3/0643* (2013.01)

(58) Field of Classification Search
CPC .. G06F 3/0674; G06F 9/3004; G06F 11/1448; G06F 3/0631; G06F 3/0643; G06F 3/067
USPC .......................... 711/112, 155, 162, 114, 173
See application file for complete search history.

(56) References Cited

U.S. PATENT DOCUMENTS

| | | | |
|---|---|---|---|
| 5,526,507 A * | 6/1996 | Hill ............................... | 711/114 |
| 9,152,353 B1 | 10/2015 | Wang et al. | |
| 9,286,007 B1 | 3/2016 | Bono | |
| 9,355,121 B1 | 5/2016 | Scheer et al. | |
| 9,400,792 B1 | 7/2016 | Bono et al. | |
| 2013/0326169 A1* | 12/2013 | Shaharabany et al. ....... | 711/161 |
| 2014/0189210 A1* | 7/2014 | Sinclair et al. ............... | 711/103 |
| 2015/0134886 A1* | 5/2015 | Kim et al. ..................... | 711/103 |
| 2015/0186262 A1* | 7/2015 | Lin et al. ...................... | 711/103 |

\* cited by examiner

*Primary Examiner* — Than Nguyen
(74) *Attorney, Agent, or Firm* — BainwoodHuang (57) ABSTRACT

A technique for storage allocation provides a first cursor and a second cursor from which to allocate blocks within a physical address space of a file system. The file system uses the first cursor for allocating blocks for writes directed to sequential logical addresses and uses the second cursor for writes directed to random (non-sequential) logical addresses.

22 Claims, 6 Drawing Sheets

ALLOCATING SPACE IN A FILE SYSTEM FROM SEQUENTIAL AND RANDOM CURSORS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Many data storage systems include file systems. As is known, a file system is a structure for organizing files and directories. The files and directories are built upon allocation units of storage, which the file system arranges in a physical address space indexed by FSBN (File System Block Number). An "allocation unit" is the smallest unit of allocatable storage in a file system and is sometimes referred to as a "block." An allocation unit may typically be 8 KB; however, allocation units may be of any size. A typical file system also includes metadata structures for organizing allocation units into files. For example, a file system may provide an inode and a set of block pointers for each file. The inode uniquely identifies the file and points to the block pointers, and the block pointers map logical addresses of the file to respective allocation units at respective physical addresses (FSBNs) in the file system.

Some file systems provide a cursor for assisting with storage allocation. The cursor generally starts at an initial, low value of FSBN and advances, one allocation unit at a time, to subsequent FSBNs as allocation proceeds.

SUMMARY

A window-based allocation scheme is currently being developed that reserves ranges of physical addresses in a file system for respective ranges of logical addresses within one or more files. According to this scheme, when a file system first allocates a block within a sequential logical address range of a file, the file system reserves an entire free range (window) of sequential physical addresses for that logical address range. Sequential writes to the logical address range thus result in a sequential layout of physical blocks within the window. In the absence of window-based allocation, different streams working concurrently on different logical address ranges may tend to interleave their block allocations, resulting in a highly fragmented layout in physical address space, even though the streams may individually work on their respective ranges sequentially.

Unfortunately, the benefits of window-based allocation can be thwarted when applications direct writes to non-sequential ("random") logical addresses within a file or across multiple files. Under these conditions, windows may become sparsely allocated, such that they each contain few allocated blocks. As the number of random writes increases, so too does the number of sparsely allocated windows. Once free windows run out, the file system may revert to conventional allocation schemes, such as the one described above. But shifting back to conventional allocation leaves the file system again susceptible to high fragmentation, such as when faced with multiple streams concurrently allocating ranges of sequential logical addresses.

In accordance with improvements hereof, a technique for storage allocation provides a first cursor and a second cursor from which to allocate blocks within a physical address space of a file system. The file system uses the first cursor for allocating blocks for writes directed to sequential logical addresses and uses the second cursor for allocating blocks for writes directed to non-sequential logical addresses.

Advantageously, examples of the disclosed technique avoid proliferating sparsely-allocated windows by coalescing random writes within windows using the second cursor, while enabling sequential writes to fill windows using the first cursor. The disclosed technique thus enables a data storage system to perform efficient block allocation in a mixed workload environment involving both sequential and random writes.

Certain embodiments are directed to a method of storing data in a file system of a data storage system. The method includes receiving write requests specifying data to be written to the file system at designated logical addresses of one or more files in the file system. The data specified in the write requests includes a first set of data to be written at sequential logical addresses and a second set of data to be written at non-sequential logical addresses. The method further includes allocating storage for the first set of data from a first cursor, the first cursor (i) pointing to a first window of contiguous physical addresses in a physical address space of the file system and (ii) designating the first window exclusively for sequential data. The method still further includes allocating storage for the second set of data from a second cursor, the second cursor (i) pointing to a second window of contiguous physical addresses in the physical address space of the file system and (ii) designating the second window exclusively for non-sequential data.

Other embodiments are directed to a data storage system constructed and arranged to perform a method of storing data in a file system of a data storage system, such as the method described above. Still other embodiments are directed to a computer program product. The computer program product stores instructions which, when executed by control circuitry of a data storage system, cause the control circuitry to perform a method of storing data in a file system of a data storage system, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for storage allocation provides a first cursor and a second cursor from which to allocate blocks within a physical address space of a file system. The first cursor is used for allocating blocks for writes directed to sequential logical addresses and the second cursor is used for allocating blocks for writes directed to non-sequential logical addresses.

Figure 1:
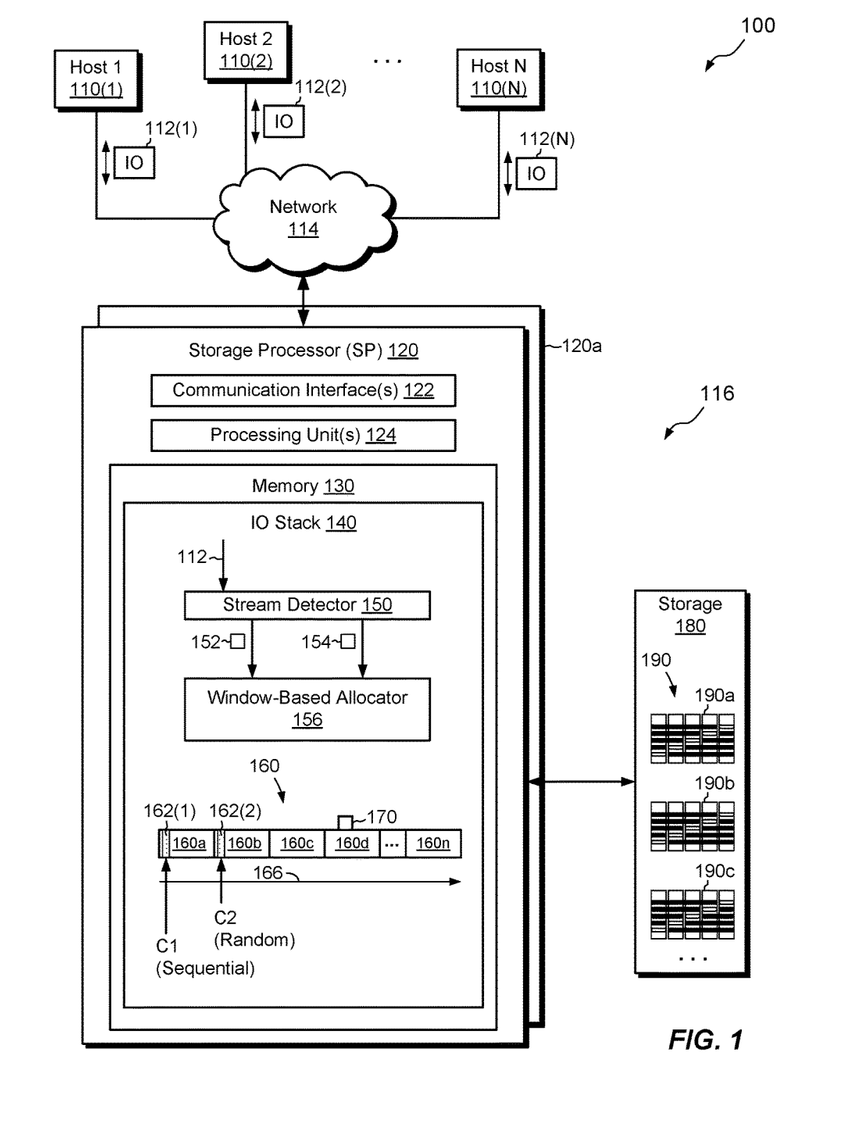
FIG. 1 is a block diagram of an example environment in which the disclosed technique hereof can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). It is understood that any number of SPs, may be provided, including a single SP, and the SP 120 can be any type of computing device capable of processing host IOs.

In an example, the storage 180 includes RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180. Although the data storage system 116 is capable of receiving and processing both block-based requests and file-based requests, it should be understood that the invention hereof is not limited to data storage systems that can do both.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140. The IO stack 140 provides an execution path for host IOs (e.g., IO requests 112(1-N)). It can be seen that the IO stack 140 includes a stream detector 150, a window-based allocator 156, and a file system 160. The file system 160 extends over a physical address range 166, in which individual allocation units may be addressed by FSBN (File System Block Number). In an example, each FSBN uniquely identifies a respective allocation unit, or "block," of storage.

As shown, the file system 160 includes multiple regions 160a to 160n. Each of the regions 160a to 160n covers a respective range of sequential physical addresses in the physical address space 166 and may represent a large extent of storage space. Each of the regions 160a to 160n includes multiple windows 162, and each window 162 covers a range of sequential physical addresses smaller than the region that contains it. Although FIG. 1 shows only two windows, 162(1) and 162(2), it is understood that each region 160a to 160n may include many windows 162 and may indeed be filled with windows 162. In an example, the regions 160a to 160n are equal in size to one another and the windows 162 within all regions 160a to 160n are equal in size. In a particular implementation, each of the regions 160a to 160n corresponds to a respective cylinder group (CG) used by the file system 160. Each CG may support 256 MB of storage, for example. It should be understood, however, that the regions 160a to 160n may be of any suitable size. Also, in a particular implementation, the size of each window 162 is the size of a stripe of the RAID groups 190. For example, if a full stripe of each of RAID groups 190 is 256 KB (excluding parity), then the size of each window 162 may cover 256 KB of physical address space 166.

FIG. 1 also shows a file 170. File 170 resides within file system 160, which provides storage for data of file 170 and metadata to support file 170 within blocks located at physical addresses within physical address space 166. Although only a single file 170 is shown, it should be understood that the file system 160 may include any number of files.

Further shown in FIG. 1 are first and second cursors, C1 and C2, respectively. C1 points to window 162(1) in region 160a, and C2 points to window 162(2) in region 160b. In this example, C1 is a "sequential" cursor and the window-based allocator 156 uses C1 for allocating storage in the file system 160 for sequential data. When the sequential cursor C1 points to a window 162, it designates the pointed-to window for receiving sequential data. Preferably, the window-based allocator 156 avoids ever placing random and sequential data in the same window 162. "Sequential data" as used herein refers to data directed to consecutive logical addresses of a file. As is known, any given file has a logical address range, which corresponds to logical offsets into the file. Sequential data therefore refers to data directed to a consecutive range of logical offsets within a file. C2 is a "random" cursor. The window-based allocator 156 uses C2 for allocating storage in file system 160 for non-sequential data. When the random cursor C2 points to a window 162, it designates the pointed-to window for receiving non-sequential data. Non-sequential data is also referred to herein as "random" data. It should be understood, however, that such random data need not pass any mathematical test for randomness. Rather, all that is meant by "random" in the context of "random data" is that the data not be sequential.

In example operation, the data storage system 116 receives IO requests 112 (e.g., any of 112(1) to 112(N)) from one or more hosts (e.g., any of hosts 110(1) to 110(N)). Each of the IO requests 112 specify data to be written to a data object served by the data storage system 116. In an example, the data object is the file 170. The data object may also be an object hosted from the file 170. As will be described, the data storage system 116 supports hosting of various types of data objects realized within files. Such data objects may include, for example, file systems, LUNs (Logical Unit Numbers, also used to refer to logical units), and VVols (Virtual Volumes, available from VMWare Software Company of Palo Alto, Calif.).

Continuing with operation, the IO requests 112 enter the IO stack 140 and propagate to stream detector 150. The stream detector 150 separates the data specified in IO requests 112 into a first set of data 152 and a second set of data 154. The first set of data 152 includes sequential data, and the second set of data 154 includes non-sequential, i.e., random, data. It should be understood that the first set of data 152 need not all be part of one continuous range of logical addresses. Rather, the first set of data 152 may include data directed to multiple ranges of logical addresses for one or more files. Thus, in some examples, even data at two sequential logical addresses of a file may qualify as sequential data.

With the sequential and random data separated, the window-based allocator 156 allocates storage for the sequential, first set of data 152 in the file system 160 using the first cursor, C1, and allocates space for the random, second set of data 154 in the file system 160 using the second cursor, C2. For example, C1 points to a first free window 162 in region 160a, such as window 162(1), and the window-based allocator 156 begins allocating the first set of data 152 from there. Likewise, C2 points to a first free window in region 160b, such as in window 162(2), and the window-based allocator 156 begins allocating the second set of data 154 from there. A window 162 is considered to be "free" only if it contains no allocated blocks. Conversely, a window is considered to be allocated (i.e., not free) if it contains any allocated blocks—even a single allocated block.

Once allocation for the first set of data 152 begins in window 162(1), the window-based allocator 156 advances C1 to the next free window in region 160a. If the size of the first set of data 152 exceeds the size of the window 162(1), the window-based allocator 156 may continue allocating sequential data in the next free window 162, and advances C1 to the subsequent free window 162. In this manner, storage allocation for sequential data proceeds window-by-window, with the sequential cursor C1 advancing to a next free window 162 each time allocation within a current window 162 begins. Once sequential allocation reaches the last free window 162 in region 160a, the sequential cursor C1 may jump forward to the next free region, i.e., to a region with at least one free window 162, such as region 160c. Window-by-window allocation will then proceed from there.

Turning now to the random allocation case, the window-based allocator 156 begins allocating of the second set of data 154 from cursor C2 in window 162(2) and proceeds block-by-block through the window 162(2), thus packing random data into the window 162(2). Once the window 162(2) is filled, the random cursor C2 advances to the next free window 162 in region 160b, and the window-based allocator 156 continues block-by-block allocation from there. Once the entire region 160b is filled with random writes, the window-based allocator 156 may advance the random cursor C2 to the next free region, e.g., to region 160d, from which block-by-block allocation may resume.

Once a window 162 is filled with data, whether it be sequential or random, the file system 160 may direct the contents of the window 162 to storage 180. For example, the contents of the window 162 may be flushed from cache to persistent structures in the file system 160. If the window 162 has the same size as a full stripe in the RAID groups 190, then flushing the data induces a highly efficient, full-stripe write on one of the RAID groups 190. Performing a full-stripe write to a RAID group avoids the need to read parity from the RAID group and thus promotes high-speed operation.

Although not a strict requirement, it is generally preferred that each of the cursors C1 and C2 allocates space within a respective region, i.e., from different ones of regions 160a to 160n. It has been observed that many activities performed by the data storage system 116, such as caching, copying, and backup, operate more efficiently on long strings of sequential data extending over many consecutive windows 162, than they do on shorter strings extending over a smaller number of windows 162. To promote long strings of sequential data in the file system 160, the window-based allocator 156 generally avoids placing the cursors C1 and C2 in the same region. Segregating random and sequential data across different regions improves the likelihood that long sequential writes can be achieved. As indicated, however, this is not necessarily a strict requirement, as placing the cursors C1 and C2 on the same region may be unavoidable in circumstances when the file system 160 becomes extremely full.

For both cursors C1 and C2, allocation generally proceeds in a single direction, e.g., from lower FSBNs to higher FSBNs. Over time, for example, free space may open up behind the cursors C1 and C2 (at lower FSBNs), but such free space may only be available for new allocations once the cursors C1 and/or C2 reach the end of file system 160, e.g., the end of physical address space 166, and wrap around back to the beginning.

With the arrangement described, sequential writes are able to fill windows 162 from the sequential cursor C1, while random writes are able to fill windows 162 from the random cursor C2. Thus, sparse allocation of windows 162 is greatly reduced without the file system 160 incurring excessive fragmentation, even in cases where multiple streams concurrently write sequential data to different logical address ranges.

Figure 2:
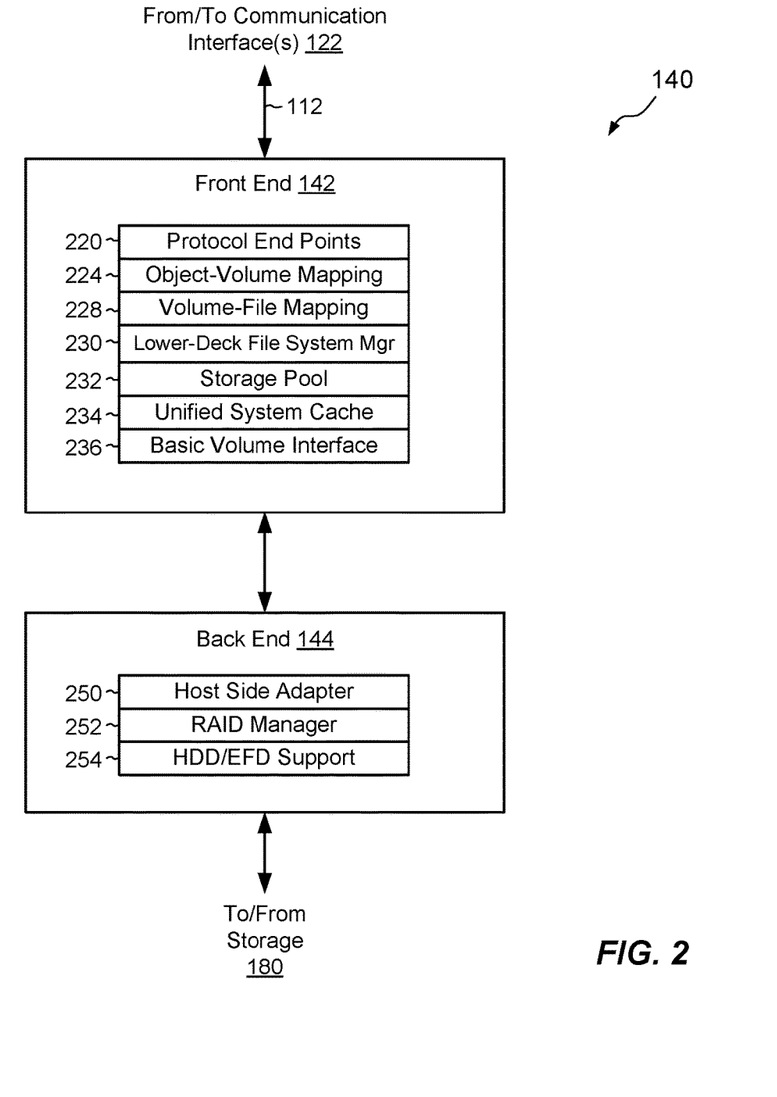
FIG. 2 is a block diagram of an example IO stack of FIG. 1 in additional detail.

FIG. 2 shows additional features of the example IO stack 140 of FIG. 1 in additional detail. The inclusion of FIG. 2 herein is intended to provide additional example context for the improvements disclosed.

As shown in FIG. 2, the IO stack 140 includes a front end 142 and a back end 144. The front end 142 and back end 144 may be operated together on the same SP, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include, from top to bottom, protocol end points 220, an object-volume mapping layer 224, a volume-file mapping 228, a lower-deck (internal) file system manager 230, a storage pool 232, the unified system cache 234, and a basic volume interface 236.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The RAID manager 252 also expresses RAID groups 190 in the form of internal LUNs (not shown). The host side adapter 250 provides an interface to the front end 142, for implementations in which the front end 142 and back end 144 run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may be disabled in the arrangement shown in FIG. 1.

The unified system cache 234 provides caching services. In some examples, the unified system cache 234 may store sequential and random data prior to flushing the data to the RAID groups 190.

The storage pool 232 organizes elements of the storage 180 in the form of slices. A "slice" is an increment of storage space, such as 256 MB or 1 GB in size, which is composed from a portion of an internal LUN 174. The pool 232 may allocate slices to lower-deck file systems to support the storage of data objects. The pool 232 may also deallocate slices from lower-deck file systems if storage provided by the slices is no longer required.

The lower-deck file system manager 230 builds and manages internal, lower-deck file systems (like file system 160) upon slices served by the storage pool 232. In some examples, lower-deck file systems can realize both block-based objects and file-based objects in the form of files, like the file 170 (FIG. 1). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, include other files that realize snaps of the file that stores the data object. Some implementations allow for storing additional files. Each lower-deck file system has an inode table. The inode table provides a different inode for each file stored in the respective lower-deck file system. Each inode stores properties of a respective file, such as its ownership, and includes and/or points to block pointers that map logical addresses of the file to physical addresses of blocks that store the file's data. As already stated, a "block" is the smallest allocatable unit of storage, which may be 8 KB in size, for example. Blocks may be of sizes different from 8 KB, however, and a data storage system may use blocks of different sizes for storing different types of data and/or metadata.

The volume-file mapping 228 maps each file realizing a data object to a respective internal volume (or LUN). Higher levels of the IO stack 140 can then access the internal volume using block-based semantics. The volume-file mapping can be achieved in a variety of ways. According to one example, a file realizing a data object is regarded as a range of blocks, and the range of blocks is expressed as a corresponding range of offsets into the file. Because volumes are accessed based on identifier (logical unit number) and offset, the volume-file mapping 228 can establish a one-to-one correspondence between logical offsets into a file and physical offsets into the corresponding internal volume, thus providing the requisite translation needed to express the file in the form of a volume.

The object-volume mapping layer 224 maps internal volumes to respective data objects accessible to hosts, such as host LUNs, host file systems, and VVols, for example. For host LUNs, object-volume mapping may involve a simple remapping from a format compatible with the internal LUN to a format compatible with the host LUN. In some examples, no remapping is needed. For host file systems, object-volume mapping may be accomplished in part by leveraging from the fact that file systems are customarily built upon volumes, such that an underlying volume is part of the structure of any host file system. Host file systems, also called "upper-deck file systems," are thus built upon the internal volumes presented by the volume-file mapping 228. Mapping of VVols can be achieved in similar ways. For block-based VVols, the object-volume mapping layer 224 may perform mapping substantially as it does for host LUNs. For file-based vVOLs, the object-volume mapping layer 224 may perform mapping by converting host-specified offsets into VVol files to corresponding offsets into internal LUNs.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
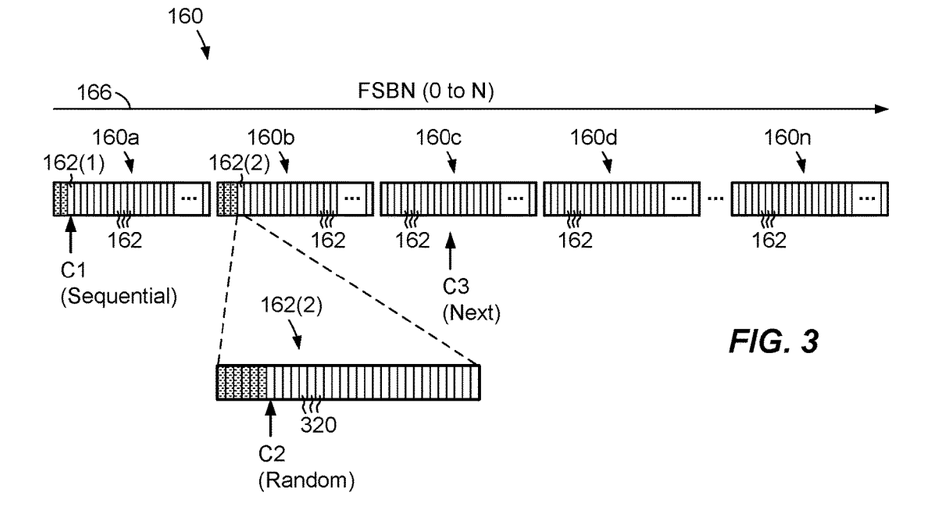
FIG. 3 is a block diagram of an example file system of FIG. 1 in additional detail, showing multiple regions of the file system as well as an example first cursor (sequential) and an example second cursor (random)

FIG. 3 shows aspects of the file system 160 in additional detail. Here, multiple windows 162 can be seen in each of the regions 160a to 160n of the file system 160. The sequential cursor C1 points to the first free window 162(1) in region 160a (free windows are shown in white, allocated blocks in shading). Unlike the sequential cursor C1, which points to a free window, the random cursor C2 points to a free block (allocation unit) within a window 162(2). As shown in the expanded view, window 162(2) includes multiple blocks 320 and C2 points to a first free block. A block is "free" if it is not allocated.

Also shown in FIG. 3 is a third cursor, C3, i.e., a "next" cursor. The next cursor C3 points to the next region (i.e., one of 160a to 160n, in the direction of allocation) that includes at least one free window 162. Here, region 160c is completely free and the next cursor C3 points there.

As allocation proceeds from the sequential cursor C1 and from the random cursor C2, one of these cursors will reach the end of its region first. The cursor that finishes first then jumps to the region pointed to by the next cursor C3 (e.g., region 160c) and resumes allocation from there. The next cursor C3 then advances to the next region with at least one free window 162 (e.g., to region 160d).

Figure 4:
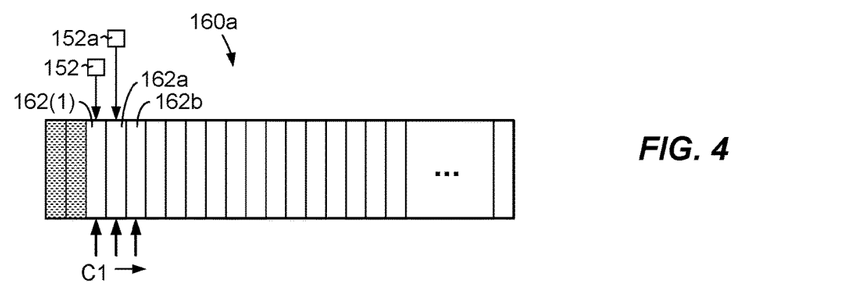
FIG. 4 is a block diagram showing an example region of the file system of FIG. 1 and an example first cursor advancing through the region.

FIG. 4 shows example operation of the sequential cursor C1 in greater detail. Here, the sequential cursor C1 always points to the next free window 162. Initially, in this example, C1 points to window 162(1). When allocation of blocks commences within window 162(1), e.g., to accommodate sequential data 152, C1 advances to the next free window, i.e., to window 162a. If additional sequential data 152a arrives, allocation will begin in window 162a and C1 will advance to window 162b. This is the case even if allocation is still proceeding in window 162(1). By pointing to the next free window, the sequential cursor C1 is always in position to allocate new sequential data, even if blocks are still being allocated in a previous window.

This operation of the sequential cursor C1 can be especially beneficial when multiple actors (e.g., threads, cores, processes, etc.) each attempt to write simultaneously to different logical address ranges of a file, or of different files. The sequential cursor C1 can accommodate all of these actors simultaneously by allocating a different window 162 to each in turn. There is no need to wait for allocation of blocks within one window 162 to finish before allowing allocation to begin in another window 162. Rather, identifications of free windows 162 by C1 can happen quickly in turn, and allocations of individual blocks 320 within windows 162 can proceed in parallel. It should be appreciated that, in this example, the sequential cursor C1 points to windows 162 rather than to individual blocks 320 within windows 162, and that allocations of individual blocks 320 within windows 162 containing sequential data may be tracked by other means, such as by using memory-resident bitmaps.

Figure 5:
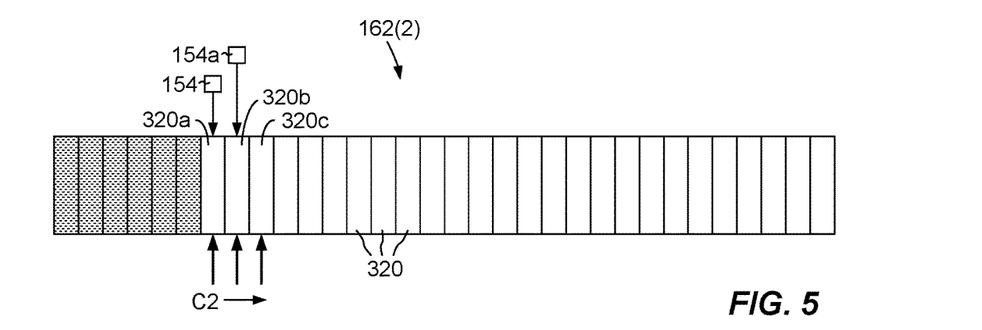
FIG. 5 is a block diagram showing an example window of physical addresses in the file system of FIG. 1 and an example second cursor advancing through the window.

FIG. 5 shows example operation of the random cursor C2 in greater detail. Here, allocation is shown within window 162(2). Unlike the sequential cursor C1, which moves one window 162 at a time, the random cursor C2 moves one block 320 at a time. For example, the random cursor C2 may initially point to block 320a. When random data 154 arrives, the window-based allocator 156 allocates block 320a and advances the random cursor C2 to the next free block, i.e., to block 320b. When random data 154a arrives, the window-based allocator 156 allocates block 320b and advances the random cursor C2 to the next free block, i.e., to block 320c. Allocation from the random cursor C2 may proceed this way, i.e., in a block-by-block fashion.

Figure 6:
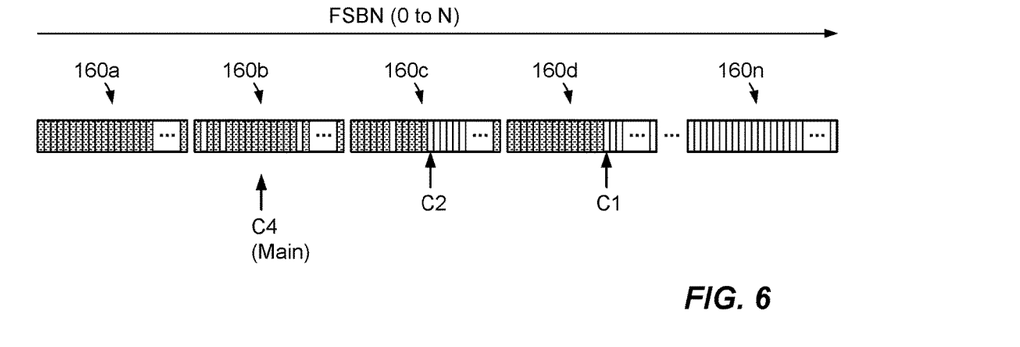
FIG. 6 is a block diagram showing the example file system of FIG. 1 and showing an example main cursor.

FIG. 6 shows an example state of the file system 160 as it begins to become full. Here, it is seen that many windows 162 have been allocated (as indicated by shading). However, some earlier-written data may have been deleted, and blocks may have been freed by de-duplication. In addition, block relocation may have freed some windows 162. As a result, certain windows 162 that were previously allocated may have become free. To support efficient operation when either of cursors C1 and C2 hit the end of the file system 160 and wrap around back to the beginning, a fourth cursor C4 is provided. The cursor C4, also referred to herein as a "main" cursor, points to the first region (one of 160a to 160n) that includes a free window 162. In this example, region 160b is the first region that includes a free window 162, so the main cursor C4 points there.

Figure 7:
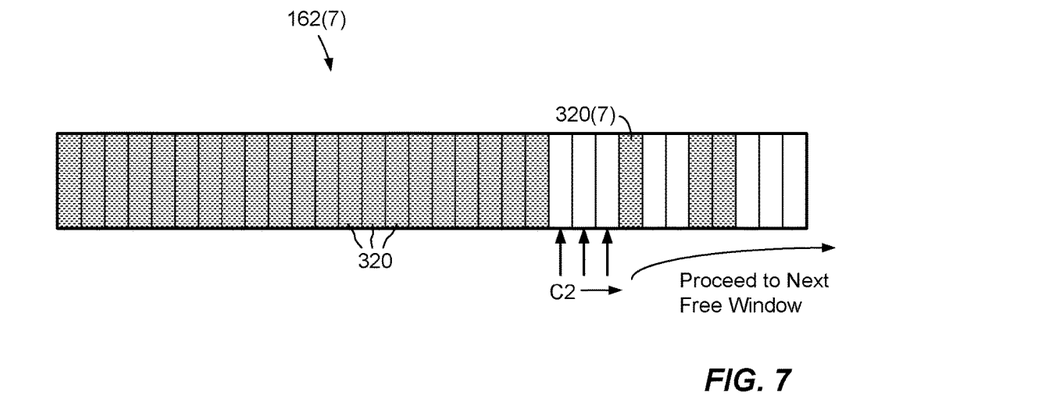
FIG. 7 is a block diagram of an example window in the example file system of FIG. 1 and shows an example second cursor advancing to a new window when encountering an already-allocated block.

FIG. 7 shows an example operation of the random cursor C2 within a window 162(7). As the cursor C2 advances one block at a time through the window 162(7), the cursor C2 may encounter a block 320(7) that is already allocated. This may occur, for example, if the cursor C2 was previously allocating within a free window 162 located before window 162(7) in the physical address space 166 (FIG. 1) and allocation continued into the window 162(7) without first checking whether window 162(7) was free. Once the cursor C2 encounters the allocated block 320(7), the window-based allocator 156 abandons further allocation within the window 162(7) and moves the cursor C2 to the next free window 162, where random allocation may resume. Further allocation is abandoned in window 162(7) as an optimization, because the presence of block 320(7) forces parity to be read from one of the RAID groups 190 before a stripe can be written. As no efficient full-stripe write is possible in this case, the cursor C2 advances to the next free window, where it may be possible to achieve a full-stripe write later.

Figure 8:
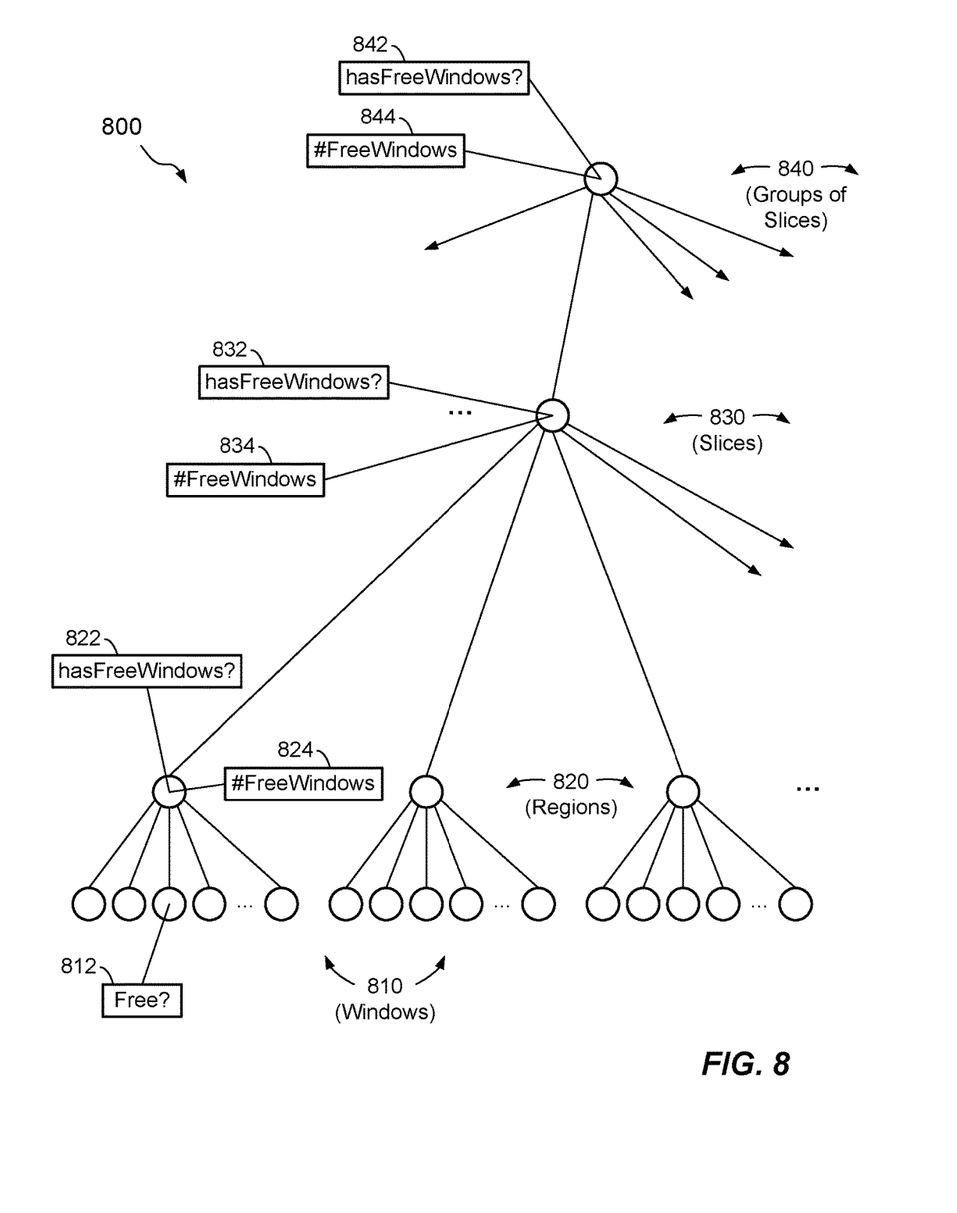
FIG. 8 is a block diagram of an example allocation tree for tracking window-based allocation in the file system of FIG. 1.

FIG. 8 shows an example allocation tree 800, which may be used for tracking free windows in the file system 160. The allocation tree 800 is seen to have multiple levels. These include, for example, Level 810 in which nodes (shown as circles) represent windows 162;

Level 820 in which nodes represent regions (e.g., regions 160a to 160n);

Level 830 in which nodes represent slices (see description accompanying FIG. 2);

and

Level 840 in which nodes represent groups of slices.

In an example, the allocation tree 800 stores metadata in connection with each node. For example, the allocation tree 800 stores, for each window 162 at level 810, a binary value 812 indicating whether the window 162 is allocated or free. For each of the regions 160a to 160n at level 820, the allocation tree 800 stores a binary value 822, indicating whether the region has any free windows 162, and an integer value 824, indicating a number of free windows 162 in that region. The allocation tree 800 stores similar values 832 and 834 for each slice at level 830, and similar values 842 and 844 at level 840 for each group of slices.

The allocation tree 800 provides a quickly-accessible and convenient structure for identifying free windows 162 and free regions when advancing the cursors C1 and C2, as well as when establishing locations for the next cursor C3 and the main cursor C4. In some examples, the window-based allocator 156 may use the values 824, 834, and 844, for numbers of free windows, to preferentially select regions, slices, and/or groups of slices to which to direct the cursors C1-C4. For instance, the window-based allocator 156 may preferentially place the sequential and random cursors C1 and C2 in regions, slices, and/or groups of slices having the greatest number of free windows. It should be understood that the allocation tree 800 may have additional levels beyond those shown, may have fewer levels than those shown, or may have levels that are different from those shown. In addition, the particular values stored at each node may be varied.

In an example, the allocation tree 800 is a memory-resident structure that is not persisted. However, the data storage system 116 preferably maintains persistent allocation bitmaps on a per-CG basis, which the data storage system 116 may use to rebuild the allocation tree 800 in the event of a system crash, power failure, or dismount/mount cycle. In some examples, the values of the cursors C1-C4 are available in memory but also stored persistently, e.g., in a superblock of the file system 160.

Figure 9:
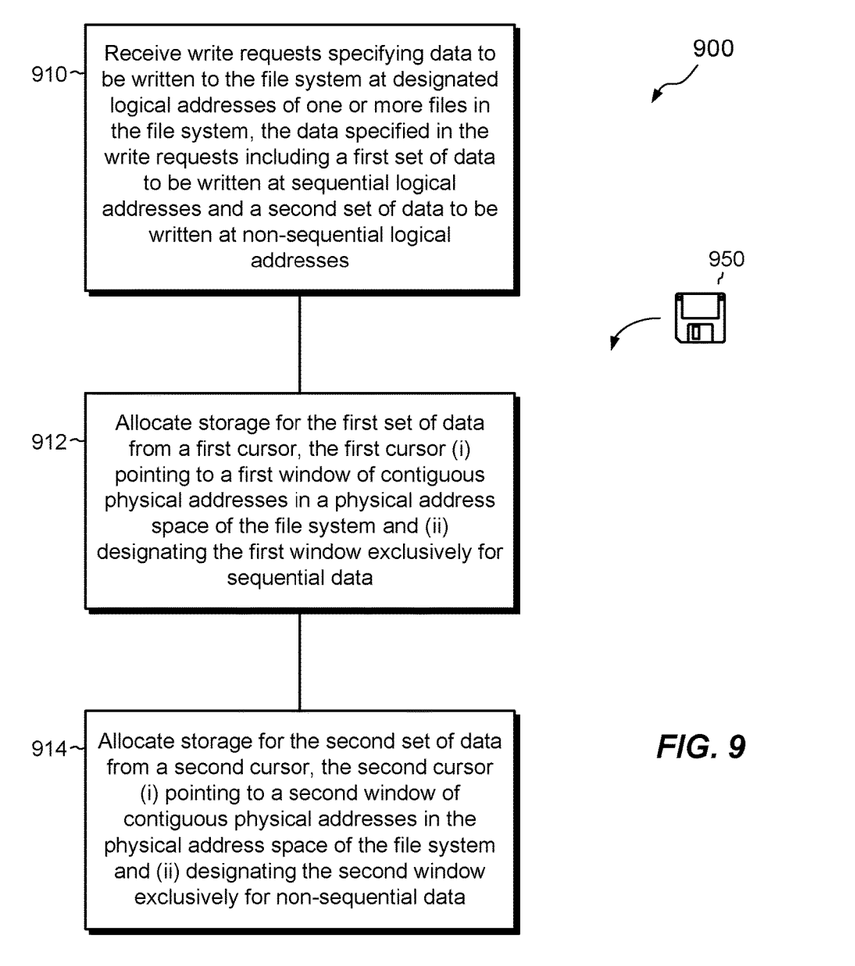
FIG. 9 is a flowchart showing an example process for storing data in a file system of a data storage system.

FIG. 9 shows a process 900 for storing data in a file system of a data storage system. The process 900 is typically carried out by the software constructs, described in connection with FIGS. 1 and 2, which reside in the memory 130 and are run by the set of processing units 124. The various acts of the process 900 may be ordered in any suitable way. Accordingly, embodiments may be constructed in which acts are performed in orders different from that illustrated, which may include performing some acts simultaneously, even though the acts are shown as sequential in the illustrated embodiments.

At 910, write requests are received that specify data to be written to the file system at designated logical addresses of one or more files in the file system. The data specified in the write requests includes a first set of data to be written at sequential logical addresses and a second set of data to be written at non-sequential logical addresses. For example, write requests 112 (FIG. 1) specify data to be written to one or more files in the file system 160 at designated logical addresses of the file or files. The stream detector 150 receives the write requests 112 and segregates the data specified therein into a first set of data 152 and a second set of data 154. The first set of data 152 includes sequential data and the second set of data 154 includes random data.

At 912, storage is allocated for the first set of data from a first cursor, the first cursor (i) pointing to a first window of contiguous physical addresses in a physical address space of the file system and (ii) designating the first window exclusively for sequential data. For example, as shown in FIG. 1, the window-based allocator 156 directs the first (sequential) cursor C1 to point to window 162(1) of contiguous physical addresses in the physical address space 166 of the file system 160. By pointing to the window 162(1), the first cursor C1 designates the window 162(1) for receiving sequential data.

At 194, storage is allocated for the second set of data from a second cursor, the second cursor (i) pointing to a second window of contiguous physical addresses in the physical address space of the file system and (ii) designating the second window exclusively for non-sequential data. For example, as further shown in FIG. 1, the window-based allocator 156 directs the second (random) cursor C2 to point to window 162(2) of contiguous physical addresses in the physical address space 166 of file system 160. By pointing to the window 162(2), the second cursor C2 designates the window 162(2) for receiving random data.

An improved technique for storage allocation has been described that provides a first cursor C1 and a second cursor C2 from which to allocate blocks 320 within a physical address space 166 of a file system 160. The file system 160 uses the first cursor C1 for allocating blocks 320 for writes directed to sequential logical addresses and uses the second cursor C2 for allocating blocks 320 for writes directed to non-sequential logical addresses. The improved technique avoids proliferating sparsely-allocated windows by coalescing random writes within windows using the second cursor C2, while enabling sequential writes to fill windows using the first cursor C1. The improved technique thus enables a data storage system to perform efficient block allocation in a mixed workload environment involving both sequential and random writes.

Having described certain embodiments, numerous alternative embodiments or variations can be made. For example, embodiments have been described in which the cursors C1 and C2 operate within an internal file system having a file that provides a realization of a host-accessible data object, such as a LUN, host file system, or VVol. This is merely an example, however. Alternatively, the cursors C1 and C2 may operate within a host file system directly. For example, the file system 160 may be a host-accessible file system and the file 170 may be a file within the host-accessible file system.

Further, although the improvements hereof have been described in connection with a data storage system 116 that realizes host-accessible objects within files of internal file systems, this also is merely an example. Alternatively, the improvements involving the cursors C1 and C2 may be applied in any type of data storage system, regardless of its internal architecture, or in any type of computer or computerized device that operates a file system.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of storing data in a file system of a data storage system, the method comprising:
receiving write requests specifying data to be written to the file system at designated logical addresses of one or more files in the file system, the data specified in the write requests including a first set of data to be written at sequential logical addresses and a second set of data to be written at non-sequential logical addresses;
allocating storage for the first set of data from a first cursor, the first cursor (i) pointing to a first window of contiguous physical addresses in a physical address space of the file system and (ii) designating the first window exclusively for sequential data; and
allocating storage for the second set of data from a second cursor, the second cursor (i) pointing to a second window of contiguous physical addresses in the physical address space of the file system and (ii) designating the second window exclusively for non-sequential data.

2. The method of claim 1,
wherein the first window is disposed in a first region of the file system, the first region including multiple windows, and
wherein the second window is disposed in a second region of the file system, the second region including multiple windows, each of the windows in the first region and the second region having multiple allocation units.

3. The method of claim 2, wherein the data specified in the write requests further includes a third set of data to be written at sequential logical addresses different from those to which the first set of data are directed, and wherein the method further comprises, prior to completing the act of allocating storage for the first set of data:
moving the first cursor to a third window of physical addresses, the third window being a next free window of physical addresses in the first region; and
initiating allocation of storage for the third set of data in the third window while still allocating storage for the first set of data in the first window.

4. The method of claim 2, wherein the method further comprises, prior to completing the act of allocating storage for the first set of data:
moving the first cursor to a next free window of physical addresses in the first region; and
continuing to allocate storage for the first set of data in the first window after moving the first cursor to the next free window.

5. The method of claim 3, wherein allocating storage for the second set of data includes:
allocating a first allocation unit of storage at the second cursor for accommodating a first portion of the second set of data;
moving the second cursor to a second allocation unit within the second window;
allocating the second allocation unit for accommodating a second portion of the second set of data; and
continuing to move the second cursor and to allocate allocation units in the second window for accommodating additional portions of the second set of data until all allocation units in the second window have been allocated.

6. The method of claim 5, wherein the data specified by the write requests includes additional non-sequential data and wherein the method further comprises:
allocating one allocation unit at a time in a single direction through an additional window of physical addresses for accommodating the additional, non-sequential data while advancing the second cursor by one allocation unit at a time each time an allocation unit in the additional window is allocated;
in response to the second cursor advancing to an allocation unit in the additional window that has already been allocated, abandoning allocation of the additional non-sequential data in the additional window and advancing the second cursor to a new window of physical addresses; and
proceeding to allocate allocation units in the new window to accommodate a remaining portion of the additional non-sequential data.

7. The method of claim 5, wherein the first cursor moves in one direction only through the physical address space of the file system, and
wherein, upon allocation being performed on a last free window of physical addresses in the first region, the method further comprises moving the first cursor to a third region of the file system, the third region including multiple windows of physical addresses each having multiple allocation units of storage, wherein at least one of the windows in the third region is free.

8. The method of claim 7, wherein the second cursor moves in one direction only through the physical address space of the file system, and
wherein, upon allocation being performed on a last free allocation unit in the second region, the method further comprises moving the second cursor to a fourth region of the file system, the fourth region including multiple windows of physical addresses each having multiple allocation units of storage, wherein at least one of the windows in the fourth region is free.

9. The method of claim 8, further comprising maintaining a main cursor, the main cursor indicating an earliest region in the physical address space of the file system that includes at least one free window.

10. The method of claim 9, wherein the method further comprises, upon performing sequential allocation on a last free window available for sequential allocation in the physical address space of the file system, moving the first cursor to an earliest free window in the earliest region of the file system pointed-to by the main cursor.

11. The method of claim 9, wherein the method further comprises, upon performing random allocation on a last free window available for non-sequential allocation of physical addresses in the physical address space of the file system, moving the second cursor to an earliest free window of physical address in the earliest region of the file system pointed-to by the main cursor.

12. The method of claim 5, further comprising setting a next cursor to indicate a next free region having at least one free window in the physical address space of the file system.

13. The method of claim 5, further comprising maintaining an allocation tree of physical addresses in the file system, the allocation tree having at least a first level of nodes representing respective regions and a second level of nodes representing respective groups of regions,
wherein for each node there is provided at least one of (i) a value indicating whether the portion of the file system address space aggregated under that node has any free windows and (ii) a value indicating a count of free windows aggregated under that node.

14. The method of claim 1, further comprising storing data of file system in multiple disk drives.

15. The method of claim 14, wherein the multiple disk drives that store the data of the file system are arranged in a set of RAID (Redundant Array of Independent Disks) groups.

16. A data storage system, comprising control circuitry that includes a set of processing units coupled to memory, the control circuitry constructed and arranged to:
receive write requests specifying data to be written to the file system at designated logical addresses of one or more files in the file system, the data specified in the write requests including a first set of data to be written at sequential logical addresses and a second set of data to be written at non-sequential logical addresses;
allocate storage for the first set of data from a first cursor, the first cursor (i) pointing to a first window of contiguous physical addresses in a physical address space of the file system and (ii) designating the first window exclusively for sequential data; and
allocate storage for the second set of data from a second cursor, the second cursor (i) pointing to a second window of contiguous physical addresses in the physical address space of the file system and (ii) designating the second window exclusively for non-sequential data.

17. The data storage system of claim 16,
wherein the first window is disposed in a first region of the file system, the first region including multiple windows, and
wherein the second window is disposed in a second region of the file system, the second region including multiple windows, each of the windows in the first region and the second region having multiple allocation units.

18. A computer program product including a set of non-transitory, computer-readable media having instructions which, when executed by control circuitry of a data storage system, cause the control circuitry to perform a method for managing data storage, the method comprising:
receiving write requests specifying data to be written to the file system at designated logical addresses of one or more files in the file system, the data specified in the write requests including a first set of data to be written at sequential logical addresses and a second set of data to be written at non-sequential logical addresses;
allocating storage for the first set of data from a first cursor, the first cursor (i) pointing to a first window of contiguous physical addresses in a physical address space of the file system and (ii) designating the first window exclusively for sequential data; and
allocating storage for the second set of data from a second cursor, the second cursor (i) pointing to a second window of contiguous physical addresses in the physical address space of the file system and (ii) designating the second window exclusively for non-sequential data.

19. The computer program product of claim 18,
wherein the first window is disposed in a first region of the file system, the first region including multiple windows, and
wherein the second window is disposed in a second region of the file system, the second region including multiple windows, each of the windows in the first region and the second region having multiple allocation units.

20. The computer program product of claim 19, wherein the method further comprises, prior to completing the act of allocating storage for the first set of data:
moving the first cursor to a next free window of physical addresses in the first region; and
continuing to allocate storage for the first set of data in the first window after moving the first cursor to the next free window.

21. The computer program product of claim 20, wherein allocating storage for the second set of data includes:
allocating a first allocation unit of storage at the second cursor for accommodating a first portion of the second set of data;
moving the second cursor to a second allocation unit within the second window;
allocating the second allocation unit for accommodating a second portion of the second set of data; and
continuing to move the second cursor and to allocate allocation units in the second window for accommodating additional portions of the second set of data until all allocation units in the second window have been allocated.

22. The computer-program product of claim 21, further comprising setting a next cursor to indicate a next free region having at least one free window in the physical address space of the file system.

* * * * *